UNITED STATES PATENT OFFICE.

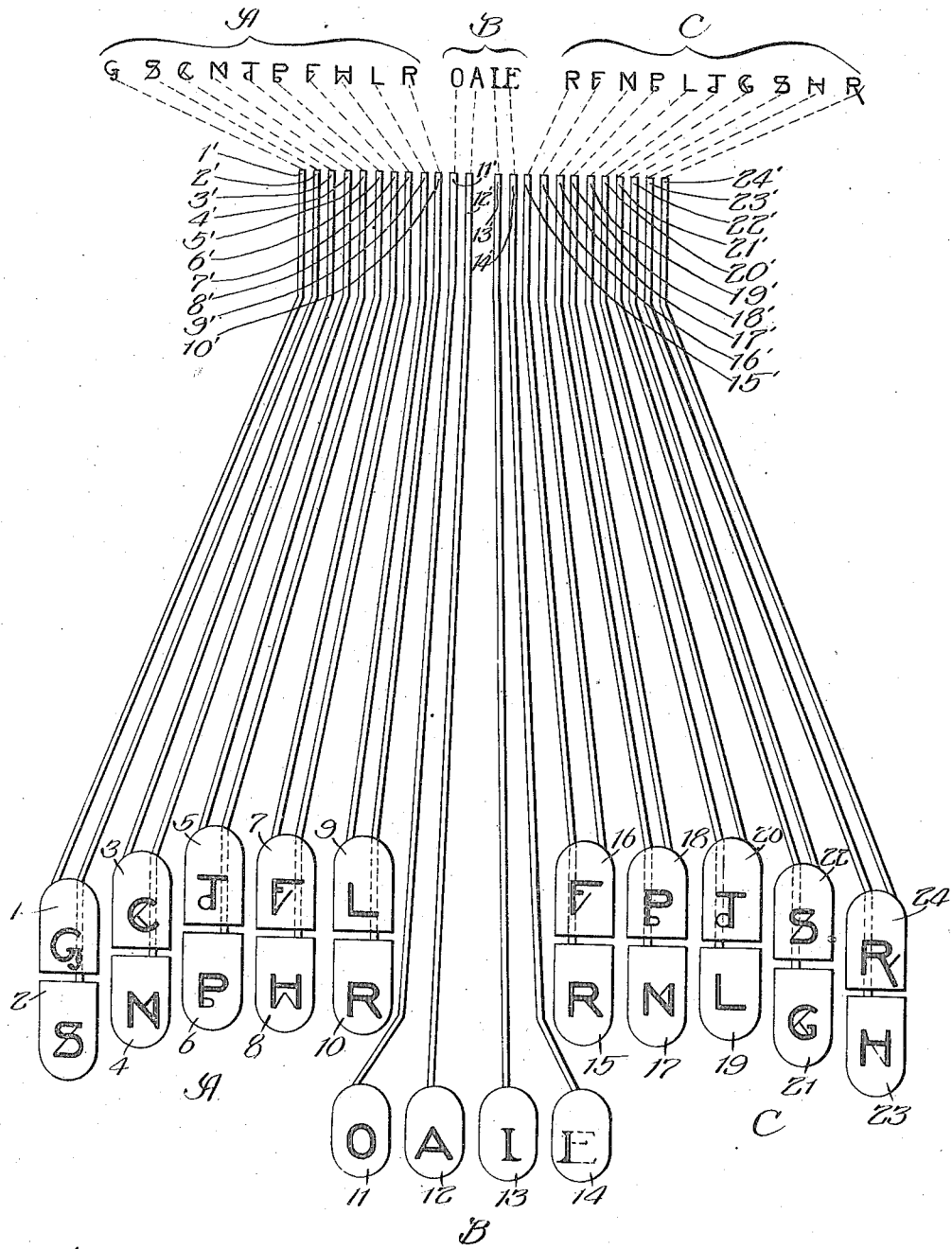

ALRAH B. EDWARDS, OF CHICAGO, ILLINOIS, ASSIGNOR TO SHORTWRITER COMPANY, OF WILMINGTON, DELAWARE, A CORPORATION OF DELAWARE.

ART OF SHORT WRITING.

1,197,191.  Specification of Letters Patent.  Patented Sept. 5, 1916.

Continuation of application Serial No. 32,554, filed June 7, 1915. This application filed November 15, 1915. Serial No. 61,523.

*To all whom it may concern:*

Be it known that I, ALRAH B. EDWARDS, a citizen of the United States, residing at Chicago, in the county of Cook and State of Illinois, have invented certain new and useful Improvements in the Art of Short Writing, of which the following is a specification.

This invention relates to the art of short writing and refers more particularly to means for recording the phonetic equivalents of spoken words in ordinary alphabetic letters or monograms thereof, so that the letters recorded are readable always in their usual sound significance.

This application is a continuation of an earlier application, Serial No. 32,554, filed June 7, 1915.

Heretofore numerous systems have been devised in which stenographic or code characters have been employed which, when printed, indicate to the trained reader the sound significance of the speech recorded. Other systems have employed arbitrary or code combinations of alphabetic letters which, when printed side by side, similarly indicate to persons familiar with the code employed the meaning intended to be conveyed. Systems belonging to either of these groups, however, require extended study by the operator before a legible record can be made with the degree of speed required in modern commercial work in competition with ordinary stenographic writing, and, moreover, the resulting record is not readable by persons other than those having an equally complete knowledge of the system employed.

It is the object of my invention to provide means whereby any person without further preparation than the mastery of the arrangement of the keys on the keyboard may become a thoroughly proficient operator under my system of short writing and capable of producing a record which is legible to any person who is able to read the printed language without any training whatever in the art of short writing.

A further object of my invention is the provision of means for simultaneously printing a plurality of ordinary alphabetic letters or monograms thereof which, when read in their usual significance and in accordance with the context of the record, indicate to the eye the sounds of one or more syllables of articulate speech.

A still further object of my invention is the provision of a keyboard comprising keys and connected type bars bearing common alphabetic letters and monograms thereof so arranged that they lend themselves most readily to simultaneous printing side by side and in single strokes to indicate phonetically the prefixes, suffixes and stems of words when the letters are read according to their usual significance, the particular letters of a monogram being selected for reading as suggested by the context of the record.

Other objects and advantages of my invention will be apparent as it is better understood by reference to the following specification when read in connection with the accompanying drawing in which the figure illustrates diagrammatically the arrangement of the keyboard and connected type bars as well as the alphabetic letters and monograms designated on the former and printed by the latter.

A keyboard is illustrated which comprises a plurality of keys numbered 1 to 24, inclusive, and divided into three groups A, B and C, group A comprising keys 1 to 10, inclusive, group B comprising keys 11 to 14, inclusive, and group C comprising keys 15 to 24, inclusive. The keys 1 to 24, inclusive, are connected by means of suitable intermediate connecting members to the type bars indicated by the reference numerals 1' to 24', inclusive. The mechanical construction of the type bars and connecting members may be identical with well-known and standard practice in key-actuated printing machines and forms no part of my present invention.

Each of the type bars 1' to 24', inclusive, is provided with a type face to print an alphabetic letter or monogram. The keys by which the type bars are actuated have for convenience corresponding letters and monograms delineated on their faces. The letters and monograms have been arranged in the printing position sequence illustrated on the drawing because it has been found that thereby the greatest number of words and syllables, and, in fact, all those words and syllables most commonly employed in the spoken language, can be printed in single strokes, it being understood that in the operation of the machine a plurality of keys are simultaneously depressed by the several fingers of the two hands and that letters and monograms corresponding to the keys depressed are printed in alinement on a suitable impression-receiving material.

The arrangement which I have found to be most advantageous is as follows: Keys 1 to 10, inclusive, constituting the group A, bear the letters and monograms thereof most frequently occurring as initial consonants and in the prefixes and stems of words, and the corresponding type bars 1' to 10' bear corresponding type faces adapted to print in alinement and from left to right in the order named the letters and monograms G—J, S—Z, C—K, M—N, T—D, P—B, F—V, H—W, L and R. Keys 11 to 14, inclusive, constituting the group B, bear from left to right in the order named the vowel letters O, A, I and E, and the corresponding type bars 11' to 14' bear type faces adapted to print these letters. The letters I and E are so formed that when printed side by side they form the vowel U, as indicated at the top of the figure. Keys 15 to 24, inclusive, constituting the group C, bear consonant letters and monograms thereof most frequently occurring as final consonants and in the suffixes and stems of words, and corresponding type bars 15' to 24' bear corresponding type faces adapted to print from left to right in the order named the letters and monograms R, F—V, N—M, P—B, L, T—D, G—K, S—Z, H—N, and R—Y.

It will be understood from the foregoing that the alphabetic letters which are combined in the form of monograms are either true alphabetic cognates or are so related that in phonetic practice they have been commonly regarded as cognates. The possibility of confusion owing to the printing of both letters is negligible since it has been demonstrated in practice that the context of the subject-matter printed will at once suggest to the eye the particular character to be read. It will be also understood that the use of my invention obviates the difficulties which have heretofore confronted the student of short writing since the letters printed indicate the sounds recorded without the artificial aid of arbitrary symbols and code combinations of letters.

I claim:

1. The combination in a short writing machine of a keyboard comprising a plurality of keys divided into groups, and a plurality of type bars operatively connected to the keys of one of said groups and bearing monograms and alphabetic letters representing the consonants G—J, S—Z, C—K, N—M, T—D, P—B, F—V, H—W, L and R.

2. The combination in a short writing machine of a keyboard comprising a plurality of keys divided into groups, and a plurality of type bars operatively connected to the keys of one of said groups and bearing monograms and alphabetic letters representing the consonants R, F—V, N—M, P—B, T—D, G—K, S—Z, H—N and R—Y.

3. The combination in a short writing machine of a keyboard comprising a plurality of keys divided into groups, a plurality of type bars operatively connected to the keys of one of said groups and bearing monograms and alphabetic letters representing the consonants G—J, S—Z, C—K, N—M, T—D, P—B, F—V, H—W, L and R, and a plurality of type bars operatively connected to the keys of another group and bearing monograms and alphabetic letters representing the consonants R, F—V, N—M, P—B, L, T—D, G—K, S—Z, H—N and R—Y, and a plurality of type bars operatively connected to the keys of a third group and bearing alphabetic letters representing the vowels A, O, I and E.

4. The combination in a short writing machine of a keyboard comprising a plurality of keys divided into groups and a plurality of type bars operatively connected to the keys of one of said groups and bearing from left to right in the order named monograms and alphabetic letters representing the consonants G—J, S—Z, C—K, N—M, T—D, P—B, F—V, H—W, L and R.

5. The combination in a short writing machine of a keyboard comprising a plurality of keys divided into groups and a plurality of type bars operatively connected to the keys of one of said groups and bearing from left to right in the order named monograms and alphabetic letters representing the consonants R, F—V, N—M, P—B, L, T—D, G—K, S—Z, H—N and R—Y.

6. The combination in a short writing machine of a keyboard comprising a plurality of keys divided into groups, a plurality of type bars operatively connected to the keys of one of said groups and bearing from left to right in the order named monograms and alphabetic letters representing the consonants G—J, S—Z, C—K, N—M, T—D, P—B, F—V, H—W, L and R, a plurality of type bars operatively connected to the keys of another group and bearing from left to right in the order named monograms and alphabetic letters representing the consonants R, F—V, N—M, P—B, L, T—D, G—K, S—Z, H—N and R—Y, and a plurality of type bars operatively connected to the keys of a third group and bearing from left to right in the order named alphabetic letters representing the vowels O, A, I and E.

ALRAH B. EDWARDS

Witnesses:
 W<small>M</small>. O. B<small>ELT</small>,
 M. A. K<small>IDDIE</small>.

Copies of this patent may be obtained for five cents each, by addressing the "Commissioner of Patents, Washington, D. C."